(12) United States Patent
O'Lenick

(10) Patent No.: US 11,174,341 B1
(45) Date of Patent: Nov. 16, 2021

(54) REGIOSPECIFIC LACTIC ACID POLYESTERS

(71) Applicant: Thomas O'Lenick, Dacula, GA (US)

(72) Inventor: Thomas O'Lenick, Dacula, GA (US)

( * ) Notice: Subject to any disclaimer, the term of this patent is extended or adjusted under 35 U.S.C. 154(b) by 23 days.

(21) Appl. No.: 16/892,968

(22) Filed: Jun. 4, 2020

(51) Int. Cl.
*C08G 63/06* (2006.01)
(52) U.S. Cl.
CPC .................................. *C08G 63/06* (2013.01)
(58) Field of Classification Search
USPC ................................................ 528/271, 272
See application file for complete search history.

(56) References Cited

U.S. PATENT DOCUMENTS

2013/0123421 A1* 5/2013 Cledat .................... C08G 63/66
524/605

* cited by examiner

*Primary Examiner* — Terressa Boykin

(57) ABSTRACT

The present invention is directed to a series of lactic acid ester polymers that are effective in making uniform films. In addition to their film forming ability, these lactic acid polyesters provide unique solubility and esthetics in cosmetic formulations, they are far more hydrophobic than other citrate ester polymers previously disclosed.

13 Claims, No Drawings

REGIOSPECIFIC LACTIC ACID POLYESTERS

GOVERNMENT SPONSORSHIP

None

RELATED APPLICATIONS

None

FIELD OF THE INVENTION

The present invention is directed to a series of lactic acid polyesters that have modified end-groups for improved solubility and performance in the personal care world. These new polyesters will provide film integrity, biodegradation, unique solubility and unexpected aesthetics in cosmetic formulation.

BACKGROUND OF THE INVENTION

Lactic acid is an organic compound with the formula $CH_3CH(OH)CO_2H$. In its solid state, it is white and water-soluble. In its liquid state, it is colorless. It is produced both naturally and synthetically. With a hydroxyl group adjacent to the carboxyl group, lactic acid is classified as an alpha-hydroxy acid (AHA). In the form of its conjugate base called lactate, it plays a role in several biochemical processes.

Polymeric reaction products of lactic acid are known. In addition to polylactide, copolymers or block copolymers based on lactic acid and other monomers are known. The lactic acid polymers of the prior art are mostly linear polymers, although branched lactic acid polymers have also been described. Thus, biodegradable polyesters are described in JP91/10972 which are composed of lactic acid and a dihydric alcohol, a dicarboxylic acid and a trifunctional acid. They are polymerized in the presence of a germanium compound acting as catalyst and are useful for the manufacture of shaped articles. Suitable for the preparation of shaped articles are biodegradable polyesters which contain, in addition to lactic acid, dihydric alcohol and dicarboxylic acid, a hydroxycarboxylic acid containing four functional groups. These products are, according to JP91/10971, also prepared in the presence of a germanium compound acting as catalyst. Another branched lactic acid polymer having a high melt flow viscosity and a high molecular weight is revealed in JP82/59880. This reference describes a polymer of aliphatic dihydric alcohols, aliphatic dicarboxylic acids, lactic acid and a trifunctional aliphatic alcohol, which polymer is obtained by polymerization in the presence of germanium oxide.

U.S. Pat. No. 5,686,540 issued Nov. 11, 1997 entitled Process for the preparation of lactic acid-based polyester to Kakizawa discloses a process for the preparation of a biodegradable lactic acid-based polyester composition excellent in thermal stability, storage stability, flexibility, heat resistance, mechanical and physical properties and moldability which comprises kneading a lactic acid-based polyester and a polyester consisting of dicarboxylic acid component(s) and diol component(s) with a chelating agent, an acidic phosphoric acid ester, a molecular weight increasing agent, etc., and then devolatizing the kneaded mixture.

U.S. Pat. No. 5,952,000 issued Sep. 14, 1999 entitled Fatty acid esters of lactic acid salts as permeation enhancers to Venkateshwaran, et al. discloses the use of fatty acid esters of lactic acid salts as permeation enhancers in matrix patch delivery devices. More particularly, this invention relates to the use of esters of one or more fatty acids and lactic acid salts as permeation enhancers when formulated with aqueous emulsion based pressure sensitive adhesives resulting in the formation of matrix patch devices for the transdermal delivery of a wide range of active permeants.

U.S. Pat. No. 6,051,663 Apr. 18, 2000 entitled Lactic acid polymers issued to Yamamoto, et al. A polymer consisting of monomer units formed from the following monomers: a) lactic acid or a $C_1$-$C_4$ alkyl ester of lactic acid, or mixtures thereof, b) at least one aliphatic $C_4$-$C_{10}$ dicarboxylic acid, and c) at least one $C_3$-$C_{10}$ alkanol containing from three to five hydroxyl groups.

The above references alone anticipate nor taken together render the polymers of the present invention obvious for the following reasons; Yamamoto, et al. is polymerizing esters of lactic acid with other monomers. They are random copolymers that contain little to no segments of poly(lactic acid). However, the current invention contains large segments or blocks of poly(lactic acid). This provides superior film forming when compared to Yamamoto's invention.

All patents referred to in this application are incorporated herein by reference. All percentages are percentage by weight unless otherwise noted and all temperatures given herein are ° C., unless otherwise noted.

The Invention

Object of the Invention

The present invention has as its objective a series of lactic acid polyesters that have modified end-groups for improved solubility and performance in the personal care world. These new polyesters will provide film integrity, biodegradation, unique solubility and unexpected aesthetics in cosmetic formulation.

Other objectives of the present invention will become clear as one of ordinary skill in the art reads the specifications.

SUMMARY OF THE INVENTION

The present invention is a series of hydroxy acid polyesters that are a product of the reaction of specific hydroxy acid or acids, and chain terminators or coupling agents.

DETAILED DESCRIPTION OF THE INVENTION

The present invention is directed to a series of lactic acid polyesters prepared by the esterification of;
1) a hydroxy acid selected from the group consisting of:
   a. lactic acid having the following structure:

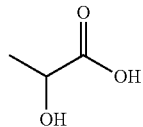

b. hydroxystearic acid having the following structure:

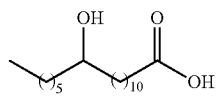

and mixtures thereof;

2) a chain terminator selected from the group consisting of:
   a. a mono-functional alcohol selected from the group consisting of:
      i. A guerbet alcohol having the following structure:

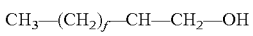

wherein;
   e is an integer ranging from 3-15;
   f is an integer ranging from 5-17;
      ii. A poly(ethylene glycol) monomethyl ether (MePEG) having the structure:

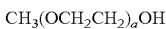

wherein;
   a is an integer ranging from 7 to 23,
   and mixtures thereof;
      iii. linear alcohol having the following structure:

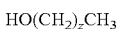

wherein;
   z is an integer ranging from 7 to 17;
   and mixtures thereof;
and/or
3) a multi-functional coupling agent independently selected from the group consisting of;
   i. dimer acid
   ii. dimer diol
   iii. diacid having the following structure:

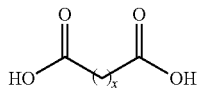

wherein;
   x is an integer ranging from 2 to 12;
   iv. diol having the following structure:

wherein;
   y is an integer ranging from 3 to 12.

Preferred Embodiments

In a preferred embodiment the hydroxy acid is lactic
In a preferred embodiment the hydroxy acid is hydroxystearic acid.
In a preferred embodiment the hydroxyl acid is a mixture of lactic acid and hydroxystearic acid.
In a preferred embodiment the chain terminator is a guerbet alcohol having the following structure:

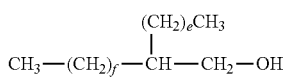

wherein;
e is an integer ranging from 3-15;
f is an integer ranging from 5-17;
In a preferred embodiment the chain terminator is a poly(ethylene glycol) monomethyl ether having the structure:

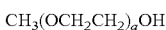

wherein;
a is an integer ranging from 7 to 23,
and mixtures thereof;
In a preferred embodiment the chain terminator is a linear alcohol having the following structure:

wherein;
z is an integer ranging from 7 to 17;
In a preferred embodiment the multi-functional coupling is dimer acid.
In a preferred embodiment the multi-functional coupling is dimer diol.
In a preferred embodiment the multi-functional coupling is glycerol
In a preferred embodiment the multi-functional coupling is citric acid
In a preferred embodiment the multi-functional coupling is diacid having the following structure:

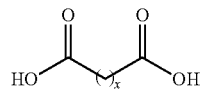

wherein;
x is an integer ranging from 2 to 12.
In a preferred embodiment the multi-functional coupling is diol having the following structure:

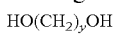

wherein;
y is an integer ranging from 3 to 12.

Raw Materials

Example 1—Lactic Acid

Lactic acid is an item of commerce. Lactic acid has the structure:

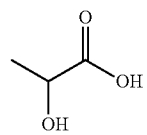

CAS Registry Number: 50-21-5
IUPAC name: 2-hydroxypropanoic acid

Example 2 Hydroxystearic Acid

Hydroxystearic acid is an item of commerce. It has the structure:

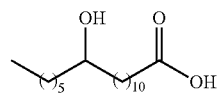

CAS Registry Number: 106-14-9
IUPAC name: 12-hydroxyoctadecanoic acid

Example 3 Dimer Diol

Dimer diol is provided by a variety of sources including Jarchem, Newark N.J. It is a composition containing the following components:

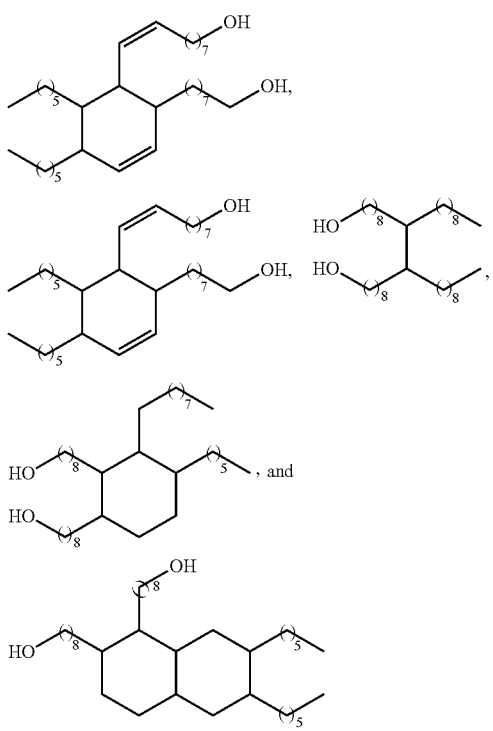

and

Examples 4-10 Fatty Alcohols Names

Fatty alcohols are useful as raw materials in the synthesis of the compounds of the present invention are commercially available from a variety of sources including BASF. They have the following structure;

| | R—OH | | |
|---|---|---|---|
| Example | Formula | Name | Molecular Weight |
| 4 | $C_8H_{18}O$ | 1-Capryl | 130.0 |
| 5 | $C_9H_{20}O$ | 1-Nonanol | 144.3 |
| 6 | $C_{10}H_{22}O$ | 1-Decanol | 158.3 |
| 7 | $C_{11}H_{24}O$ | Undecanol | 172.3 |
| 8 | $C_{12}H_{26}O$ | Dodecanol | 186.3 |
| 9 | $C_{18}H_{38}O$ | Stearyl | 270.5 |
| 10 | $C_{22}H_{46}O$ | Behenyl | 326.6 |

Examples 11-13 Guerbet Alcohols

Guerbet alcohols useful as raw materials in the preparation of compounds of the present invention are commercially available from a variety of sources including Sasol North America Incorporated of Houston Tex. A Review of Guerbet Chemistry by Anthony J. O'Lenick, Jr. is available at http://www.zenitech.com The structures are well known to those skilled in the art. It is:

$CH_3—(CH_2)_f—CH—CH_2—OH$ wherein;
e is an integer ranging from 3-15;
f is an integer ranging from 5-17;

| Example | e | f | Molecular Weight |
|---|---|---|---|
| 11 | 15 | 17 | 466.0 |
| 12 | 13 | 11 | 410.0 |
| 13 | 9 | 7 | 298.0 |

Examples 14-18 Poly(Ethylene Glycol) Monomethyl Ether

Poly(ethylene glycol) monomethyl ether is commercially available from a variety of sources one of which is FCI Technology of Gastonia, N.C. It conforms to the following structure;

$CH_3(CH_2CH_2O)_d—H$ wherein;
d is an integer from 5 to 25.

| Example | d | Molecular Weight (g/mol) |
|---|---|---|
| 14 | 5 | 237.0 |
| 15 | 8 | 367.0 |
| 16 | 15 | 676.0 |
| 17 | 23 | 1027.0 |
| 18 | 25 | 1116.0 |

Examples 19-21

Diols are useful as raw materials in the synthesis of the compounds of the present invention are commercially available from a variety of sources including BASF. They conform to the following structure;

$HO—(CH_2)_a—OH$ wherein;
a is an integer ranging from 3 to 12.

| Example | Common Name | a | Molecular Weight |
|---|---|---|---|
| 19 | Propanediol | 3 | 76.0 |
| 20 | Decanediol | 10 | 174.0 |
| 21 | Dodecanediol | 12 | 202.0 |

Dicarboxylic Acid

Dicarboxylic acid useful as raw materials in the synthesis of the compounds of the present invention are commercially available from a variety of sources including Cognis. They conforms to the following structure;

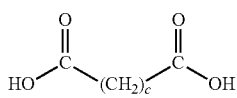

wherein;
c is an integer ranging from 1 to 10.

Saturated Dicarboxylic Acids

| Example | Common Name | c | Molecular Weight |
|---|---|---|---|
| 22 | Malonic | 1 | 104 |
| 23 | Succinic | 2 | 118 |
| 24 | Glutaric | 3 | 132 |
| 25 | Adipic | 4 | 146 |
| 26 | Pimelic | 5 | 160 |
| 27 | Subric | 6 | 174 |
| 28 | Azelaic | 7 | 188 |
| 29 | Sebacic | 8 | 202 |
| 30 | Undecanedioic | 9 | 216 |
| 31 | Dodecanedioic | 10 | 230 |

Example 32 Dimer Acid

Dimer acid is an item of commerce available commercially from Henkel Corporation. It conforms to the following structure:

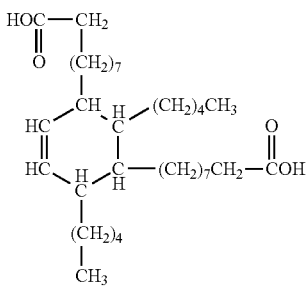

Example 33 Hydrogenated Dimer Acid

Hydrogenated dimer acid is an item of commerce available commercially from Henkel Corporation. It conforms to the following structure:

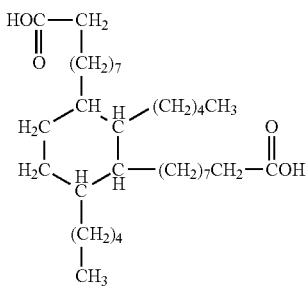

General Procedure
Lactic Acid Terminated Polyesters

To the specified number of grams of lactic acid (Example 1) and tin (II) 2-ethylhexanoate (catalyst) are placed into a round bottom flask equipped with thermometer, agitation and nitrogen spurge. The reaction mixture is heated to 150-160° C. under agitation. The temperature is held as water is distilled off. As the polymerization is occurring, the viscosity is increased. Once the polymerization reaches the desired viscosity, a specific number of chain terminator (Examples 4-18) are added. The polymerization is allowed to continue for 2-4 hours. The reaction is monitored by viscosity and the quantity of water distilled off. The products are used without purification.

| Lactic acid terminated polyesters | | | |
|---|---|---|---|
| | Lactic Acid Example 1 | Alcohol | |
| Example | (g) | Example | Grams |
| 16 | 116.38 | 4 | 33.62 |
| 17 | 115.34 | 9 | 34.66 |
| 18 | 120.78 | 10 | 29.22 |
| 19 | 111.51 | 11 | 38.49 |
| 20 | 103.05 | 12 | 46.95 |
| 21 | 90.24 | 13 | 59.76 |
| 22 | 82.62 | 15 | 67.38 |
| 23 | 43.10 | 18 | 106.90 |

| Mixed Terminated Lactic Acid Polymers | | | | | |
|---|---|---|---|---|---|
| | Lactic Acid Example 1 | Alcohol 1 | | Alcohol 2 | |
| Example | (g) | Example | Grams | Example | Grams |
| 24 | 101.66 | 4 | 14.68 | 13 | 7.54 |
| 25 | 85.42 | 9 | 25.67 | 12 | 38.91 |
| 26 | 115.98 | 10 | 14.00 | 11 | 20.02 |
| 27 | 177.54 | 11 | 8.49 | 15 | 23.97 |
| 28 | 84.73 | 9 | 12.73 | 18 | 52.53 |
| 29 | 108.28 | 10 | 19.65 | 15 | 22.08 |
| 30 | 112.69 | 11 | 29.17 | 4 | 8.14 |
| 31 | 108.85 | 12 | 24.79 | 9 | 16.36 |
| 32 | 111.36 | 13 | 18.44 | 10 | 20.21 |
| 33 | 102.54 | 11 | 26.55 | 15 | 20.91 |
| 34 | 84.01 | 13 | 13.91 | 18 | 52.08 |

| Lactic Acid Coupled polymers. | | | | | |
|---|---|---|---|---|---|
| | Lactic Acid Example 1 | Coupling Agent | | Terminating Group | |
| Example | (g) | Example | Grams | Example | Grams |
| 35 | 68.46 | 3 | 81.54 | — | — |
| 36 | 128.33 | 19 | 21.67 | — | — |
| 37 | 108.17 | 20 | 41.83 | — | — |
| 38 | 103.53 | 21 | 46.83 | — | — |
| 39 | 118.84 | 23 | 31.16 | — | — |
| 40 | 105.80 | 28 | 44.20 | — | — |
| 41 | 99.26 | 31 | 50.74 | — | — |
| 42 | 64.22 | 33 | 85.74 | — | — |
| 43 | 86.21 | 3 | 51.34 | 4 | 12.45 |
| 44 | 108.30 | 19 | 9.15 | 9 | 32.55 |
| 45 | 96.39 | 20 | 18.63 | 10 | 34.98 |
| 46 | 86.10 | 21 | 19.32 | 11 | 44.58 |
| 47 | 73.13 | 3 | 43.55 | 12 | 33.32 |
| 48 | 105.97 | 19 | 8.95 | 13 | 35.09 |
| 49 | 77.14 | 20 | 14.91 | 15 | 57.94 |
| 50 | 60.87 | 21 | 13.66 | 18 | 75.47 |
| 51 | 129.23 | 23 | 5.68 | 13 | 14.35 |
| 52 | 128.23 | 28 | 8.93 | 9 | 12.85 |
| 53 | 124.37 | 31 | 10.59 | 10 | 15.04 |
| 54 | 122.36 | 33 | 27.24 | 9 | 0.41 |

All of these compounds are highly desirable for cosmetic products.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

What is claimed:

1. A lactic acid polyester prepared by the esterification of;
1) a hydroxy acid selected from the group consisting of:
   a. lactic acid having the following structure:

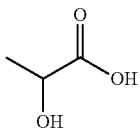

b. hydroxystearic acid having the following structure:

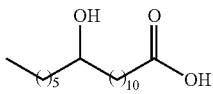

and mixtures thereof;
2) a chain terminator having the following structure:
   a. a mono-functional alcohol selected from the group consisting of:
      i. a guerbet alcohol having the following structure:

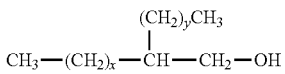

wherein;
      y is an integer ranging from 3-15;
      x is an integer ranging from 5-17;
      ii. a poly(ethylene glycol) monomethyl ether (MePEG) having the structure:
      $CH_3(OCH_2CH_2)_aOH$ wherein;
      a is an integer ranging from 7 to 23,
      and mixtures thereof;
      iii. linear alcohol having the following structure:
      $HO(CH_2)_zCH_3$ wherein;
      z is an integer ranging from 7 to 17;
      and mixtures thereof;
and
3) a multi-functional coupling agent independently selected from the group consisting of;
   i. dimer acid
   ii. dimer diol
   iii. diacid having the following structure:

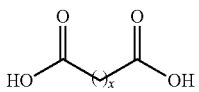

wherein;
   x is an integer ranging from 2 to 12;
   iv. diol having the following structure:
   $HO(CH_2)_yOH$ wherein;
   y is an integer ranging from 3 to 12.
2. The lactic acid polyester of claim 1 wherein the hydroxy acid is lactic.
3. The lactic acid polyester of claim 1 wherein the hydroxy acid is hydroxystearic acid.
4. The lactic acid polyester of claim 1 wherein the hydroxy acid is a mixture of lactic acid and hydroxystearic acid.
5. The lactic acid polyester of claim 1 wherein the chain terminator is a guerbet alcohol having the following structure:

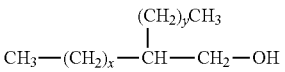

wherein;
y is an integer ranging from 3-15;
x is an integer ranging from 5-17.
6. The lactic acid polyester of claim 1 wherein the chain terminator is a poly(ethylene glycol) monomethyl ether having the structure:
$CH_3(OCH_2CH_2)_aOH$ wherein;
a is an integer ranging from 7 to 23.
7. The lactic acid polyester of claim 1 wherein the chain terminator is a linear alcohol having the following structure:
$HO(CH_2)_zCH_3$ wherein;
z is an integer ranging from 7 to 17.
8. The lactic acid polyester of claim 1 wherein the multi-functional coupling agent is dimer acid.
9. The lactic acid polyester of claim 1 wherein the multi-functional coupling agent is dimer diol.
10. The lactic acid polyester of claim 1 wherein the multi-functional coupling agent is glycerol.
11. The lactic acid polyester of claim 1 wherein the multi-functional coupling agent is citric acid.
12. The lactic acid polyester of claim 1 wherein the multi-functional coupling agent is a diacid having the following structure:

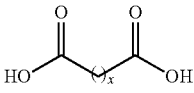

wherein;
x is an integer ranging from 2 to 12.
13. The lactic acid polyester of claim 1 wherein the multi-functional coupling agent is diol having the following structure:
$HO(CH_2)_yOH$ wherein;
y is an integer ranging from 3 to 12.

* * * * *